US008931294B2

(12) United States Patent
Yamada et al.

(10) Patent No.: US 8,931,294 B2
(45) Date of Patent: Jan. 13, 2015

(54) COOLING UNIT AND WORK PIECE CONVEYING EQUIPMENT USING IT

(75) Inventors: Takaya Yamada, Osaka (JP); Yasuhiro Nishimori, Osaka (JP)

(73) Assignee: Daihen Corporation (JP)

( * ) Notice: Subject to any disclaimer, the term of this patent is extended or adjusted under 35 U.S.C. 154(b) by 149 days.

(21) Appl. No.: 13/549,703

(22) Filed: Jul. 16, 2012

(65) Prior Publication Data

US 2013/0019626 A1 Jan. 24, 2013

(30) Foreign Application Priority Data

Jul. 20, 2011 (JP) ................................ 2011-159048

(51) Int. Cl.
*F25D 23/12* (2006.01)
*B25J 19/00* (2006.01)

(52) U.S. Cl.
CPC .................................. *B25J 19/0054* (2013.01)
USPC ................. 62/259.2; 62/119; 62/371; 62/372

(58) Field of Classification Search
CPC ..... F25B 23/006; F25B 39/02; F25B 2339/02
USPC .......... 62/119, 371–372, 516–518, 62, 259.2, 62/268
See application file for complete search history.

(56) References Cited

U.S. PATENT DOCUMENTS 6,176,098 B1 * 1/2001 Moriguchi .................. 62/259.2
6,755,092 B2 * 6/2004 Wakabayashi et al. .... 74/490.03
2007/0269320 A1 * 11/2007 Yoshioka ..................... 417/283

FOREIGN PATENT DOCUMENTS

JP 2010-177411 A 8/2010

* cited by examiner

*Primary Examiner* — Cassey D Bauer
*Assistant Examiner* — Steve Tanenbaum
(74) *Attorney, Agent, or Firm* — Cantor Colburn LLP

(57) ABSTRACT

An object is to provide a cooling unit which can reduce influence of radiation heat from a work piece having high temperature on members surrounding the work piece, prevent leak of coolant and vacuum leak, reduce cost, and prevent turning angle of a work piece conveying mechanism from being limited. The cooling unit is attached to the work piece conveying mechanism in the state that the outer wall part is in close contact with the to-be-cooled surface. The coolant stored in the lower space is evaporated by the heat transmitted from the to-be-cooled surface P via the outer wall part, and the to-be-cooled surface is cooled via the outer wall part by the heat of evaporation lost at the time of the evaporation of the coolant. The vapor in the lower space (coolant container) is discharged to the vacuum chamber by the vapor exhaust unit when the pressure of the vapor in the lower space reaches the fixed value or higher.

3 Claims, 10 Drawing Sheets

(a)

(b)

(a)

(b)

(a)

(b)

COOLING UNIT AND WORK PIECE CONVEYING EQUIPMENT USING IT

TECHNICAL FIELD

The present invention relates to an art of a cooling unit which cools a to-be-cooled surface of a work piece conveying mechanism conveying a work piece inside a vacuum chamber, and a work piece conveying equipment using the cooling unit.

BACKGROUND ART

Conventionally, concerning to a work piece conveying equipment having a work piece conveying mechanism conveying a work piece inside a vacuum chamber, an art is known in which a cooling unit which cools a to-be-cooled surface of the work piece conveying mechanism so as to reduce influence of radiation heat from the work piece having high temperature on members surrounding the work piece. For example, described in the Patent Literature 1.

In the art described in Patent Literature 1, a cooling pipe as a cooling unit is disposed in a work piece conveying mechanism. The cooling pipe is connected to a pump circulating coolant. Accordingly, the coolant can be circulated in the cooling pipe so as to cool the work piece conveying mechanism. Namely, members surrounding the work piece can be cooled, thereby reducing influence of radiation heat from the work piece having high temperature.

PRIOR ART REFERENCE

Patent Literature

Patent Literature 1: the Japanese Patent Laid Open Gazette 2010-177411

DISCLOSURE OF INVENTION

Problems to Be Solved by the Invention

However, in the art described in Patent Literature 1, the cooling pipe is formed by connecting a plurality of pipe members. Therefore, the coolant may leak through the connecting part of the pipe members or vacuum leak may occur. The pump must be disposed, whereby the cost is increased. The pump must be arranged outside a vacuum chamber, whereby the turning angle of the work piece conveying mechanism is limited by the cooling pipe arranged between the work piece conveying mechanism and the pump.

The present invention is provided in consideration of the conditions as mentioned above, and the purpose of the invention is to provide a cooling unit which can reduce influence of radiation heat from a work piece having high temperature on members surrounding the work piece, prevent leak of coolant and vacuum leak, reduce cost, and prevent turning angle of a work piece conveying mechanism from being limited.

Means for Solving the Problems

The above-mentioned problems are solved by the present invention with the following means.

A cooling unit according to claim 1 which cools a to-be-cooled surface of a work piece conveying mechanism conveying a work piece in a vacuum chamber, includes a coolant container storing a coolant, an outer wall part constituting an outer wall of the coolant container and having thermal conductivity, and a vapor exhaust part which can discharge vapor generated from the coolant stored in the coolant container to the outside of the coolant container. The cooling unit is attached to the work piece conveying mechanism in a state that the outer wall part is in close contact with the to-be-cooled surface. The coolant stored in the coolant container is evaporated by heat transmitted from the to-be-cooled surface via the outer wall part, and the to-be-cooled surface is cooled via the outer wall part by heat of evaporation lost at the time of the evaporation of the coolant. The vapor in the coolant container is discharged to the vacuum chamber by the vapor exhaust part when a pressure of the vapor in the coolant container reaches a fixed value or higher.

In a cooling unit according to claim 2, the vapor exhaust part includes a communication part causing the coolant container to communicate with the vacuum chamber, a valve body arranged in a reciprocatingly movable manner in the communication part, a sealing member located on the coolant container side relative to the valve body in the communication part and arranged in close contact with the valve body so as to seal the inside of the communication part, and a biasing means biasing the valve body toward the sealing member. The valve body is opened and closed relative to the sealing member in accordance with the pressure of the vapor in the coolant container so as to switch the sealing state of the inside of the communication part.

A work piece conveying equipment according to claim 3 employing a work piece conveying mechanism conveying a work piece in a vacuum chamber, includes a cooling unit cooling a to-be-cooled surface of the work piece conveying mechanism, wherein a cooling unit according to claim 1 or 2 is employed as the cooling unit.

In a work piece conveying equipment according to claim 4, the cooling unit is attached to the work piece conveying mechanism in a state that an aluminum film is inserted between the outer wall part and the to-be-cooled surface.

Effect of the Invention

The present invention constructed as the above brings the following effects.

The cooling unit according to the present invention can reduce influence of radiation heat from the work piece having high temperature on the members surrounding the work piece, prevent leak of the coolant and vacuum leak, reduce the cost, and prevent turning angle of the work piece conveying mechanism from being limited.

DETAILED DESCRIPTION OF THE INVENTION

Next, an explanation will be given on the mode for carrying out the present invention.

Firstly, an explanation will be given on entire construction of a work piece conveying equipment 1 using a cooling unit 100 according to an embodiment of the present invention.

In below explanation, longitudinal, lateral and vertical directions are defined based on directions of arrows in FIG. 1.

The work piece conveying equipment 1 has a work piece conveying mechanism 20 conveying a work piece inside a vacuum chamber. In below explanation, a laminate member such as a liquid crystal panel is supposed as the work piece. However, the work piece is not limited thereto.

Figure 1:
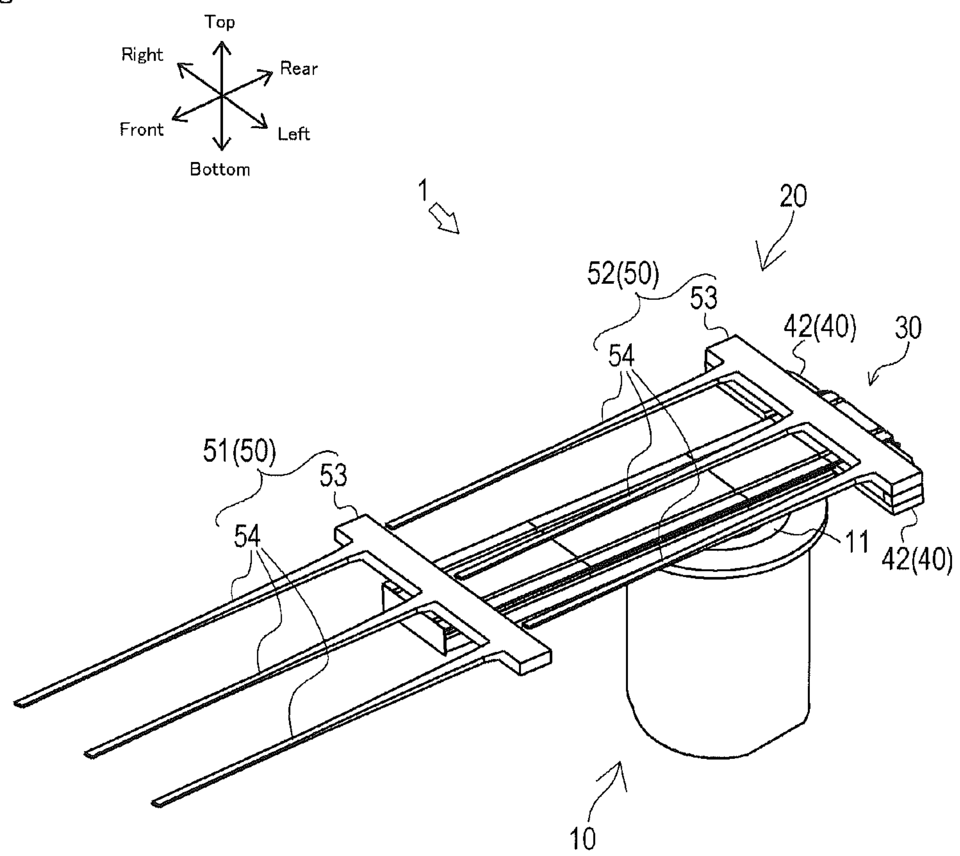
FIG. 1 A perspective view of entire construction of a work piece conveying equipment using a cooling unit according to an embodiment of the present invention.

As shown in FIG. 1, the work piece conveying equipment 1 mainly includes a casing 10 and the work piece conveying mechanism 20.

The casing 10 supports the lower side of the work piece conveying mechanism 20. As shown in FIG. 1, the casing 10 is formed to be substantially a hollow cylinder whose axis is along the vertical direction. A casing driving unit (not shown) is disposed inside the casing 10. A pivot 11 whose axis is along the vertical direction is disposed in the upper portion of the casing 10. The lower portion of the pivot 11 is arranged inside the casing 10 and connected to the casing driving unit. By the casing driving unit, the pivot 11 is movable vertically reciprocatingly relative to the casing 10 and rotatable clockwise and counterclockwise when viewed in plan. The upper portion of the casing 10 is arranged inside the vacuum chamber. On the other hand, the lower portion of the casing 10 is arranged outside the vacuum chamber.

Figure 2:
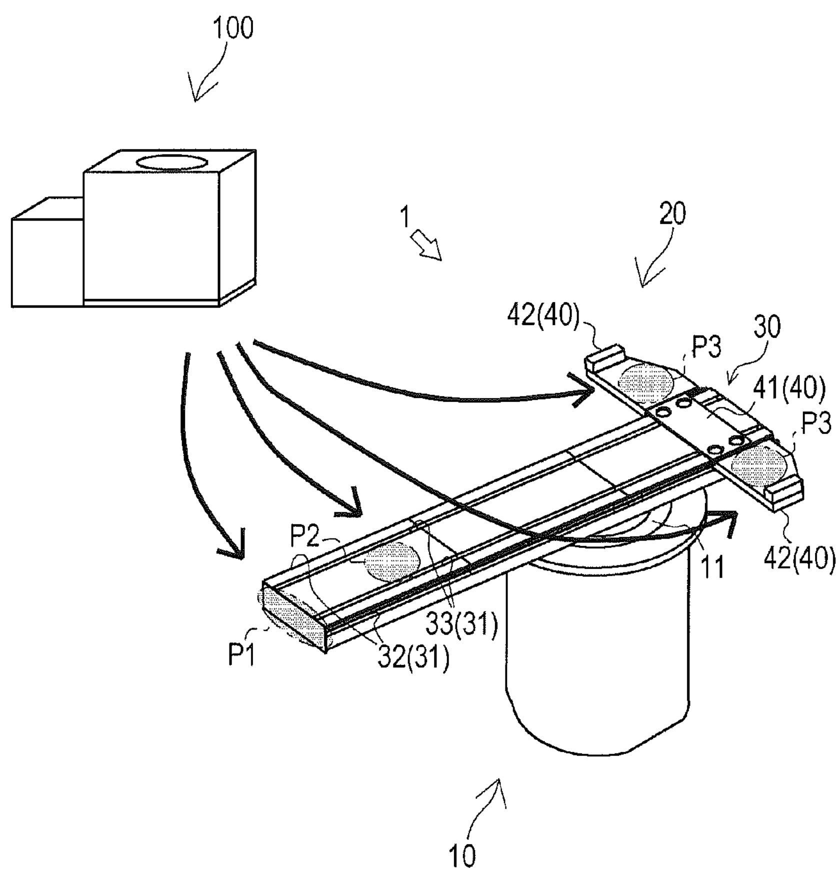
FIG. 2 A perspective view of the work piece conveying equipment in FIG. 1 omitting illustration of a first hand and a second hand.

The work piece conveying mechanism 20 conveys the work piece horizontally. The work piece conveying mechanism 20 is fixed to the upper end of the pivot 11. As shown in FIGS. 1 and 2, the work piece conveying mechanism 20 mainly includes a main body 30, sliders 40, hands 50 and the cooling unit 100.

The main body 30 is a main structure of the work piece conveying mechanism 20. The main body 30 is formed to be a substantially rectangle whose lengthwise direction is along the longitudinal direction and whose surfaces are directed upward and downward. A pair of two guide rails 31 whose lengthwise direction is along the longitudinal direction is formed in the upper surface of the main body 30. Hereinafter, one of the guide rails 31 which is arranged outside is referred to as an "outer guide rail 32", and the other of the guide rails 31 which is arranged more inside than the outer guide rail 32 is referred to as an "inner guide rail 33". A main body driving unit (not shown) is disposed inside the main body 30.

The sliders 40 support the hands 50. The sliders 40 engage respectively with the outer guide rail 32 and the inner guide rail 33 so as to be movable (slidable) longitudinally. Hereinafter, the slider 40 engaging with the inner guide rail 33 is referred to as an "inner slider 41", and the sliders 40 engaging with the outer guide rail 32 are referred to as "outer sliders 42".

The inner slider 41 is a substantially platy member whose surfaces are directed upward and downward. The inner slider 41 is arranged just above the main body 30. Each of the outer sliders 42 is a substantially platy member whose surfaces are directed upward and downward. On the other hand, the outer sliders 42 are arranged respectively at the left and right sides of the main body 30. The inner slider 41 and the outer sliders 42 are connected via a driving transmission mechanism such as a belt (not shown) to the main body driving unit. The inner slider 41 and the outer sliders 42 are movable reciprocatingly longitudinally by the driving power of the main body driving unit transmitted via the driving transmission mechanism.

Each of the hands 50 is a member which holds the work piece or on which the work piece is mounted. The hand 50 mainly includes a hand fixation part 53 whose lengthwise direction is along the lateral direction and a holding claw 54 extended forward from the hand fixation part 53. The two hands 50 are provided and fixed respectively to the inner slider 41 and the outer sliders 42. Hereinafter, the hand 50 fixed to the inner slider 41 is referred to as a "first hand 51", and the hand 50 fixed to the outer sliders 42 is referred to as a "second hand 52".

The first hand 51 and the second hand 52 are movable (slidable) reciprocatingly longitudinally respectively via the inner slider 41 and the outer sliders 42. The vertical height of the first hand 51 is different from that of the second hand 52 so as not to interfere each other even if the hands move independently.

The cooling unit 100 reduces influence of radiation heat from the work piece on members surrounding the work piece when the conveyed work piece has high temperature.

A detailed explanation of the construction of the cooling unit 100 will be given later.

As mentioned above, the work piece conveying equipment 1 can move the work piece conveying mechanism 20 vertically reciprocatingly and rotate it clockwise and counterclockwise via the pivot 11 of the casing 10. The first hand 51 and the second hand 52 of the work piece conveying mechanism 20 are movable reciprocatingly longitudinally respectively via the inner slider 41 and the outer sliders 42. Namely, the work piece conveying equipment 1 can convey the work piece held by the first hand 51 and the second hand 52 to an optional position in the longitudinal, lateral and vertical directions.

The work piece conveying equipment 1 is an embodiment of the "work piece conveying equipment" according to the present invention. The work piece conveying mechanism 20 is an embodiment of the "work piece conveying mechanism" according to the present invention. The "work piece conveying equipment" and the "work piece conveying mechanism" according to the present invention are not limited to the construction as mentioned above.

Next, an explanation will be given on the cooling unit 100 in detail.

Figure 3:
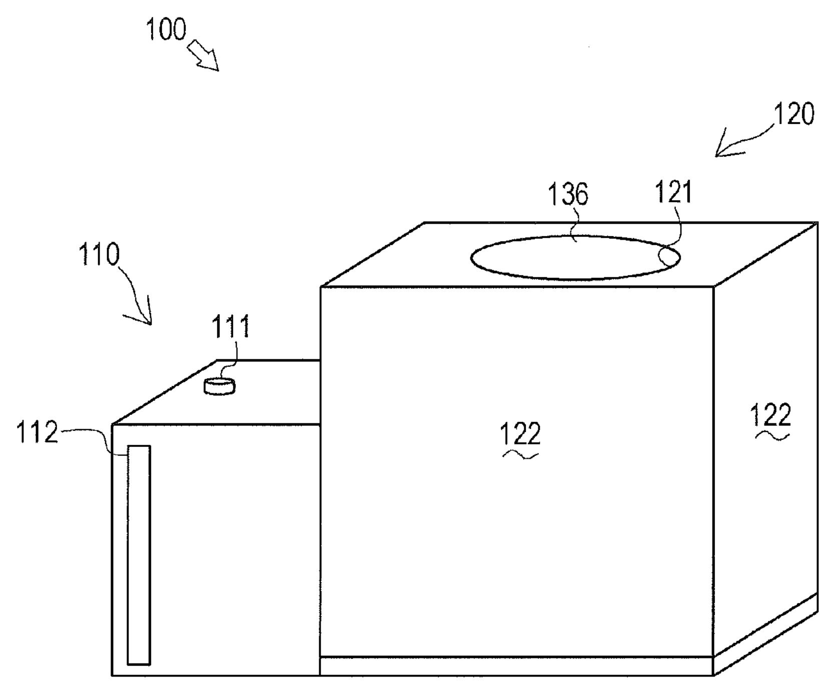
FIG. 3 A perspective view of a cooling unit.
Figure 4:
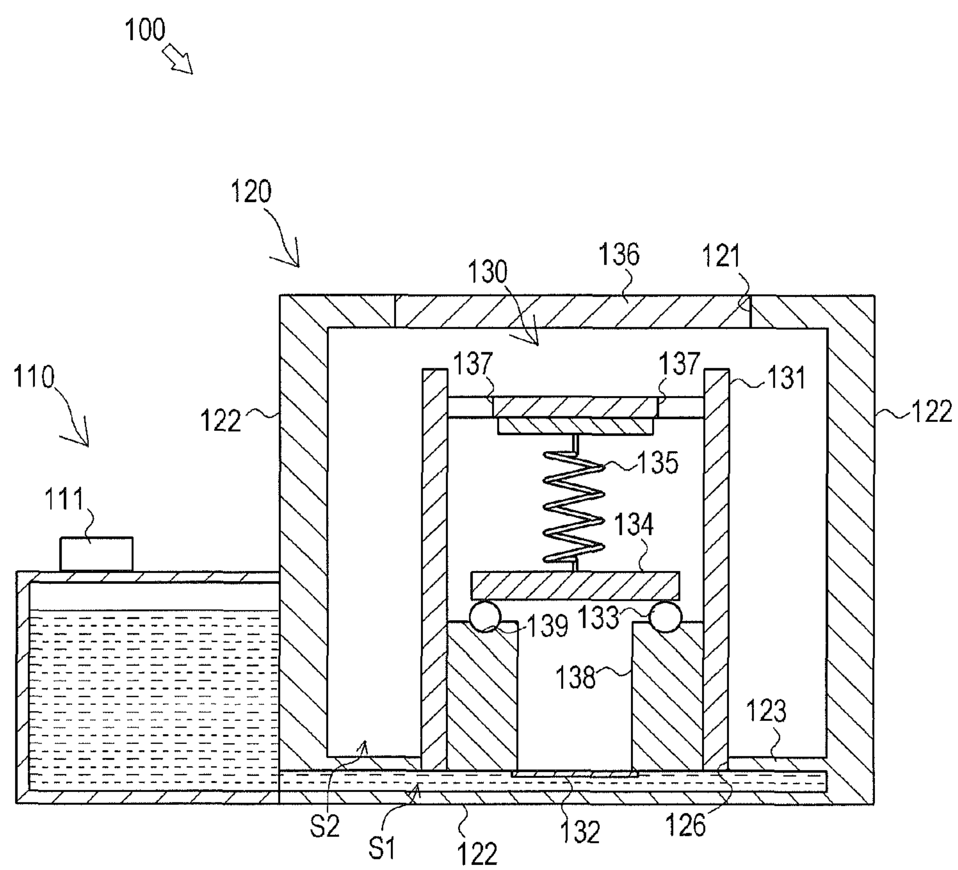
FIG. 4 A sectional side view of the cooling unit.

As shown in FIGS. 3 and 4, the cooling unit 100 mainly includes a tank part 110, a cooling main body 120 and a vapor exhaust unit 130.

The tank part 110 is a member in which water as a coolant is stored. The tank part 110 is formed by an airtight hollow member. An inlet 111 through which water is poured is provided in the tank part 110. A water meter 112 indicating the quantity of stored water is provided in the tank part 110 so that the quantity of water in the tank part 110 can be checked by seeing the water meter 112 from the outside. In this embodiment, water is used as the coolant. However, the coolant is not limited thereto and may be another medium which does not cause injury to the work piece or the work piece conveying equipment 1 in vacuo (such as alcohol).

The cooling main body 120 stores the vapor exhaust unit 130 and cools the work piece conveying mechanism 20 (in more detail, a to-be-cooled surface P discussed later). The cooling main body 120 is substantially hollow cubic. An upper opening 121 opened vertically is formed in an upper plate of the cooling main body 120. A dustproof cap 136 is attached to the upper opening 121. The dustproof cap 136 prevents foreign matters in the cooling main body 120 such as dust from being discharged to the vacuum chamber. The cooling main body 120 is connected to the tank part 110.

An outer wall part 122 (side and lower plates) of the cooling main body 120 is formed by material with high thermal conductivity, such as aluminum, stainless steel or another metal material or resin material.

A partition 123 is formed inside the cooling main body 120. The partition 123 is extended toward the center from the outer wall part 122 (side plate) of the cooling main body 120. At the center of the partition 123, a center opening 126 penetrating vertically the partition 123 is formed. Accordingly, the cooling main body 120 is divided into upper and lower two spaces by the partition 123. Hereinafter, the lower space is referred to as a "lower space S1" and the upper space is referred to as an "upper space S2".

The lower space S1 of the cooling main body 120 communicates with the tank part 110. Namely, openings are formed oppositely respectively in the lower portions of the cooling main body 120 and the tank part 110. Then, the two openings are connected to each other so as to cause the lower space S1 to communicate with the tank part 110. Accordingly, water stored in the tank part 110 flows through the two openings into the lower space S1 of the cooling main body 120.

The vapor exhaust unit 130 acts in accordance with the pressure of water vapor therein so as to discharge the water vapor to the outside. The vapor exhaust unit 130 is arranged in the center opening 126 of the partition 123 inside the cooling main body 120. As shown in FIG. 4, the vapor exhaust unit 130 mainly includes a communication part 131, a moisture permeable waterproof seat 132, a sealing member 133 such as an O-ring, a valve body 134 and a spring 135.

The communication part 131 is substantially a hollow cylinder whose axis is along the vertical direction. The communication part 131 is extended upward from the center opening 126 of the partition 123. The lower end of the communication part 131 is formed so as not to enter the inside of the lower space S1 of the cooling main body 120. The upper end of the communication part 131 is arranged just below the upper opening 121 of the cooling main body 120. Accordingly, the communication part 131 is arranged inside the upper space S2 of the cooling main body 120. An opening 137 opening vertically is formed in the upper plate of the communication part 131. A diametric reducing part 138 is arranged in the lower portion of the inside of the communication part 131. The diametric reducing part 138 is substantially a hollow cylinder whose axis is along the vertical direction.

The moisture permeable waterproof seat 132 is not permeable about water and permeable about moisture (water vapor). The moisture permeable waterproof seat 132 covers the lower opening of the diametric reducing part 138. Accordingly, water vapor of water flowing into the lower space S1 is permitted to enter the inside of the upper space S2 (in more detail, the inside of the communication part 131). On the other hand, the water flowing into the lower space S1 is prevented from entering the inside of the upper space S2 (in more detail, the inside of the communication part 131).

The sealing member 133 seals the upper opening of the diametric reducing part 138 of the communication part 131. The sealing member 133 is engaged with a circular groove 139 formed in the upper surface of the diametric reducing part 138.

The valve body 134 seals the upper opening of the diametric reducing part 138 with the sealing member 133. The valve body 134 is a substantially flat plate whose surfaces are directed upward and downward. The outer diameter of the valve body 134 is larger than the outer diameter of the sealing member 133. The axis of the valve body 134 overlaps the axis of the communication part 131 (the diametric reducing part 138). The valve body 134 is movable vertically inside the diametric reducing part 138.

The spring 135 applies biasing force on the valve body 134. The upper end of the spring 135 is connected to the lower side of the upper plate of the communication part 131. The lower end of the spring 135 is connected to the upper side of the valve body 134. Accordingly, the spring 135 always applies biasing force downward on the valve body 134. Then, the sealing member 133 is in close contact with the valve body 134 so as to seal the upper opening of the diametric reducing part 138.

The cooling unit 100 is attached so that any part of the outer wall part 122 of the cooling main body 120 is in close contact with the part of the work piece conveying mechanism 20 which is to be cooled by the cooling unit 100 (hereinafter, referred to as the "to-be-cooled surface P"). As the to-be-cooled surface P, the part which is arranged around the work piece with high temperature held by the first hand 51 and the second hand 52 (members surrounding the work piece) is supported. In more detail, as shown in FIG. 2, the front surface (to-be-cooled surface P1) and the upper surface of the front part (to-be-cooled surface P2) of the work piece conveying mechanism 20, and the upper surfaces of the outer sliders 42 (to-be-cooled surface P3) are supposed.

A detailed explanation of the attachment construction of the work piece conveying mechanism 20 of the cooling unit 100 to the to-be-cooled surface P will be discussed later.

The water flowing into the lower space S1 is an embodiment of the "coolant container" according to the present invention. The outer wall part 122 of the cooling main body 120 is an embodiment of the "outer wall" according to the present invention. The vapor exhaust unit 130 is an embodiment of the "vapor exhaust part" according to the present invention. The "coolant container", the "outer wall" and the "vapor exhaust part" according to the present invention are not limited to the construction mentioned above.

Next, an explanation will be given on the construction in which the cooling unit 100 cools the to-be-cooled surface P of the work piece conveying mechanism 20 referring to FIG. 5.

When the work piece held by the first hand 51 and the second hand 52 has high temperature, the members surrounding the work piece in the work piece conveying mechanism 20 (the to-be-cooled surface P) are heated by the radiation heat from the work piece. Then, when the temperature of the to-be-cooled surface P of the work piece conveying mechanism 20 becomes higher than the temperature of the outer wall part 122 of the cooling unit 100, as shown by an arrow A in FIG. 5(*a*), the heat of the to-be-cooled surface P is conducted to the outer wall part 122. The heat conducted to the outer wall part 122 is conducted via the outer wall part 122 to the whole cooling main body 120. The heat conducted to the whole cooling main body 120 is conducted to water flowing into the lower space S1 of the whole cooling main body 120. Then, the water is evaporated by the conducted heat, thereby generating water vapor.

When the water is evaporated and the water vapor is generated, heat energy is lost from the surroundings. Namely, by the heat of evaporation, the heat of the surroundings is absorbed and the surroundings are cooled. Then, when the lower space S1 of the cooling main body 120 is cooled, the whole cooling main body 120 is cooled via the outer wall part 122. When the temperature of the outer wall part 122 of the cooling main body 120 becomes low, the cooling main body 120 cannot absorb heat from the to-be-cooled surface P having high temperature. As a result, the heat of the to-be-cooled surface P of the work piece conveying mechanism 20 is transmitted to the outer wall part 122 of the cooling main body 120, whereby the to-be-cooled surface P is cooled.

As mentioned above, the cooling unit 100 can cool the to-be-cooled surface P of the work piece conveying mechanism 20 so as to reduce the influence of the radiation heat from the work piece having high temperature on the members surrounding the work piece.

Next, an explanation will be given on the action of the vapor exhaust unit 130 of the cooling unit 100 in detail referring to FIGS. 5 and 6.

When the water flowing into the lower space S1 of the cooling main body 120 is evaporated and the water vapor is generated as mentioned above, as shown by an arrow B in FIG. 5(*a*), the generated water vapor passes through the moisture permeable waterproof seat 132 and enters the upper space S2, in more detail, the inside of the diametric reducing part 138 of the communication part 131.

Figure 5:
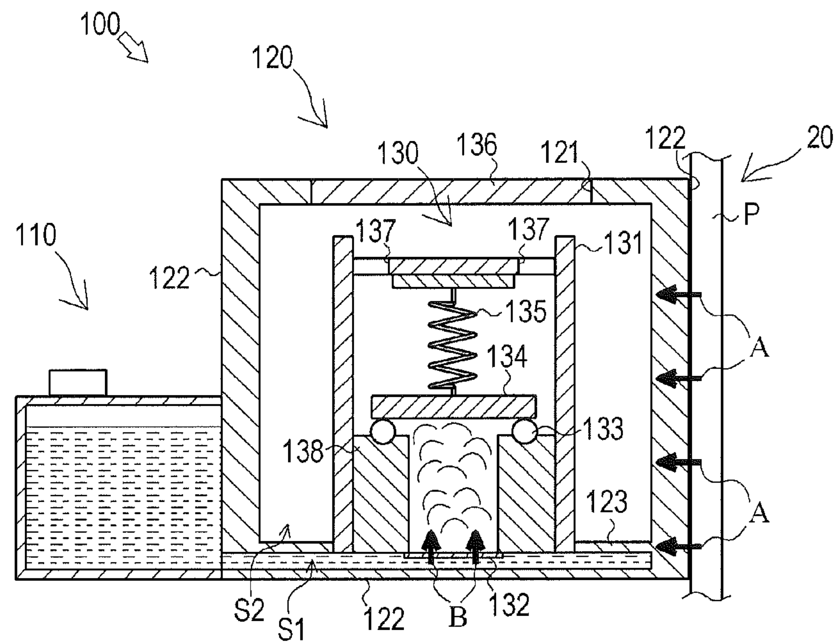
FIG. 5 (*a*) A drawing of action of a vapor exhaust unit at the time of cooling by the cooling unit. (*b*) A drawing of action of the vapor exhaust unit at the time of cooling by the cooling unit.
Figure 5:
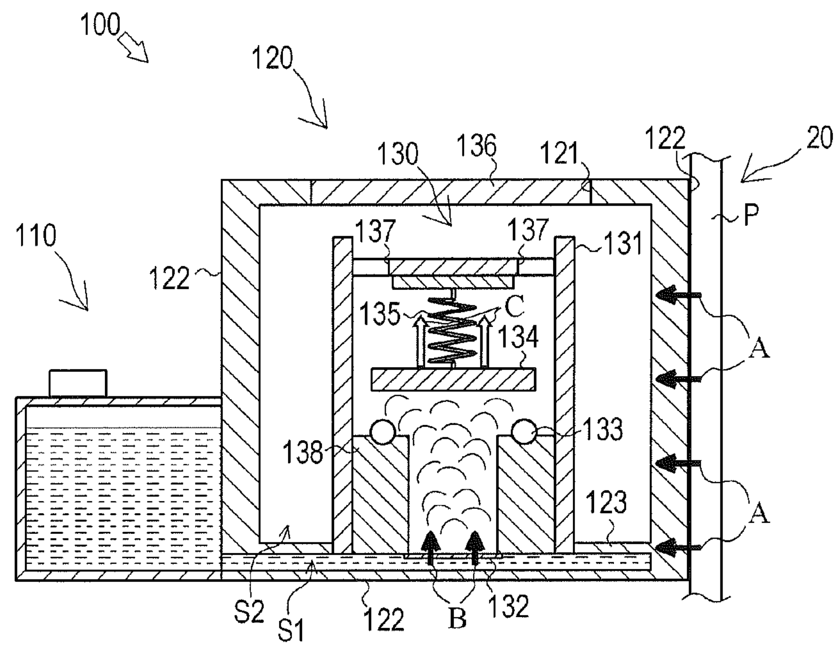

Next, as shown by an arrow C in FIG. 5(*b*), when the pressure of the water vapor entering the inside of the diametric reducing part 138 of the communication part 131 becomes higher than a fixed value, the valve body 134 moves upward. Herein, as mentioned above, the spring 135 applies biasing force downward on the valve body 134. Therefore, when the power pushing the valve body 134 upward by the pressure of the water vapor entering the inside of the diametric reducing part 138 becomes larger than the downward biasing force of the spring 135, the valve body 134 moves upward. When the valve body 134 moves upward, the closing of the upper opening of the diametric reducing part 138 is released.

Figure 6:
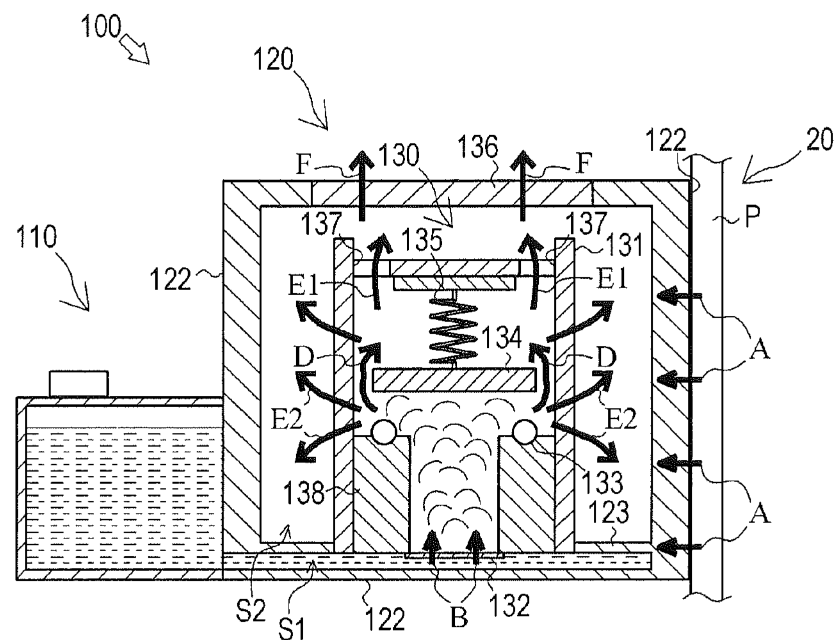
FIG. 6 (*a*) A drawing of action of the vapor exhaust unit at the time of cooling by the cooling unit. (*b*) A drawing of action of the vapor exhaust unit at the time of cooling by the cooling unit.
Figure 6:
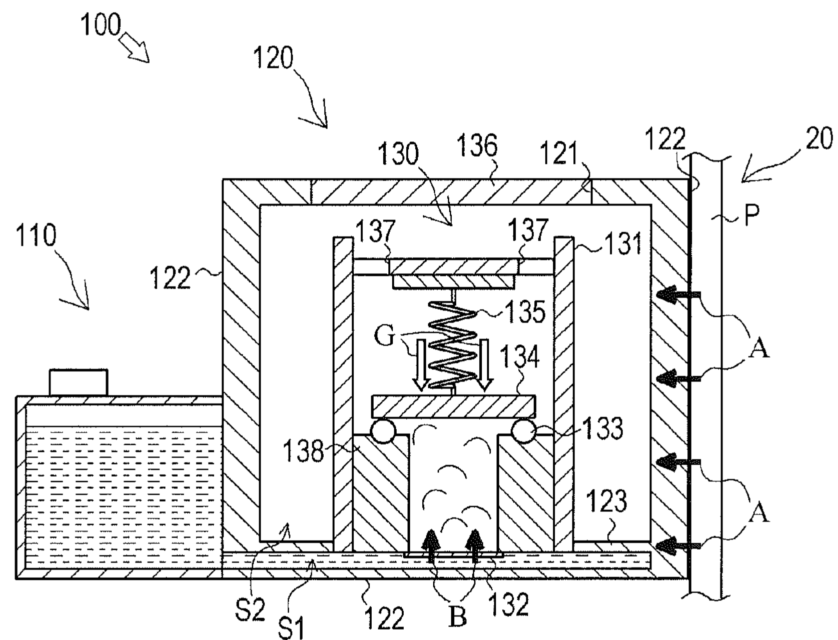

Next, as shown by an arrow D in FIG. 6(*a*), when the closing of the upper opening of the diametric reducing part 138 is released, the water vapor entering the inside of the diametric reducing part 138 of the communication part 131 is discharged inside the communication part 131 and above the diametric reducing part 138. As shown by arrows E1 and E2 in FIG. 6(*a*), the water vapor discharged above the diametric reducing part 138 is discharged inside the cooling main body 120 and outside the communication part 131 via the opening 137 formed in the upper plate of the communication part 131 and an opening (not shown) (the water vapor is spread inside the cooling main body 120 and outside the communication part 131). As shown by an arrow F in FIG. 6(*a*), the water vapor discharged outside the communication part 131 is discharged outside the cooling main body 120, that is, discharged to the vacuum chamber, which is the outside of the cooling unit 100, via the dustproof cap 136 attached to the upper opening 121 of the cooling main body 120.

Accordingly, by the action of the vapor exhaust unit 130, the water vapor entering the inside of the diametric reducing part 138 of the communication part 131 is discharged inside the communication part 131 and above the diametric reducing part 138, discharged inside the cooling main body 120 and outside the communication part 131, and finally discharged to the vacuum chamber.

When the water vapor entering the inside of the diametric reducing part 138 of the communication part 131 is discharged inside the communication part 131 and above the diametric reducing part 138, the pressure of the water vapor inside the diametric reducing part 138 is reduced. Then, as shown by an arrow G in FIG. 6(*b*), when the power pushing the valve body 134 upward by the pressure of the water vapor entering the inside of the diametric reducing part 138 becomes smaller than the downward biasing force of the spring 135, the valve body 134 moves downward. When the valve body 134 moves downward, the sealing member 133 is pushed downward so as to seal the upper opening of the diametric reducing part 138.

As mentioned above, the cooling unit 100 can discharge the water vapor generated at the time of cooling the to-be-cooled surface P of the work piece conveying mechanism 20 to the vacuum chamber by the action of the vapor exhaust unit 130. Accordingly, when the cooling unit 100 is not employed for the cooling, the water flowing into the lower space S1 is prevented from being evaporated and reduced. Namely, when it is not necessary to cool the to-be-cooled surface P and the water does not reach the temperature at which the water is evaporated, the valve body 134 is kept being closed, and the closing of the upper opening of the diametric reducing part 138 is maintained. As a result, the water vapor does not enter the vacuum chamber, whereby the pressure inside the diametric reducing part 138 is not reduced so as to prevent the water from tending to evaporate. When the cooling unit 100 is employed for the cooling, the water vapor generated by the evaporation of the water flowing into the lower space S1 can be discharged suitably from the cooling unit 100.

Figure 10:
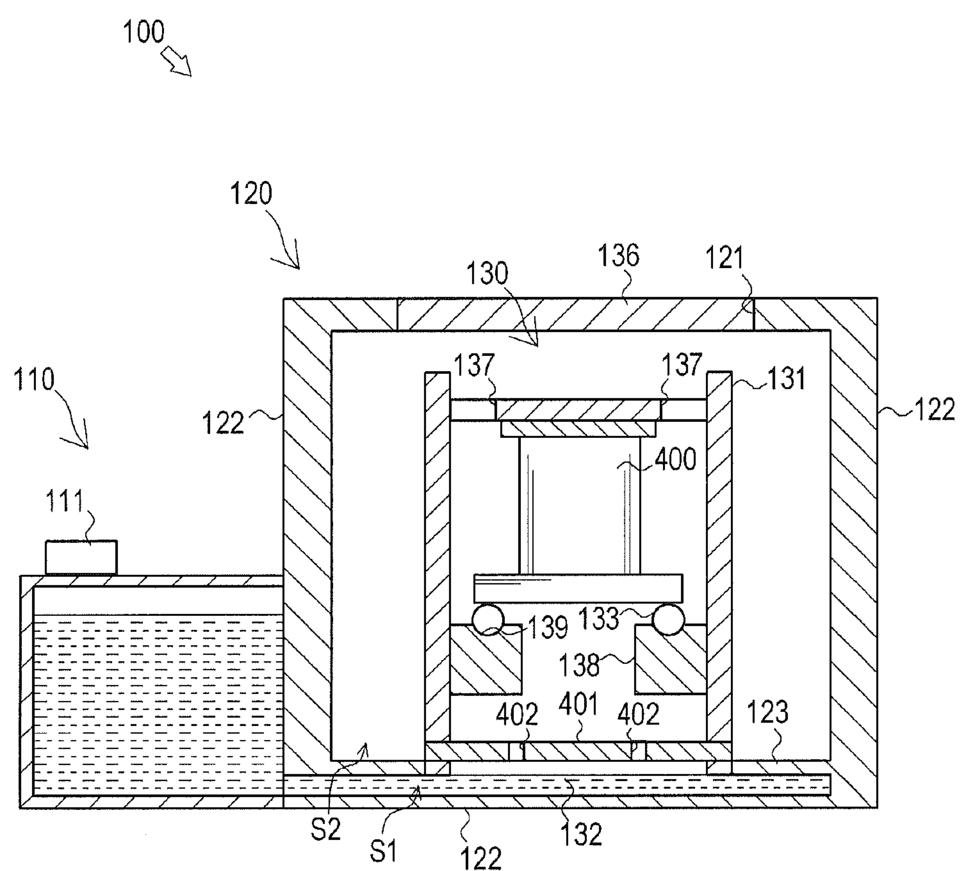
FIG. 10 A sectional side view of the cooling unit according to the second embodiment of the present invention.

As mentioned above, the vapor exhaust unit 130 is an embodiment of the "vapor exhaust part" according to the present invention. As shown in FIG. 10, instead of the valve body 134 and the spring 135, a relief valve 400 may be employed. Instead of the moisture permeable waterproof seat 132, a through-hole 402 for deaeration may be bored in a flange 401.

Figure 7:
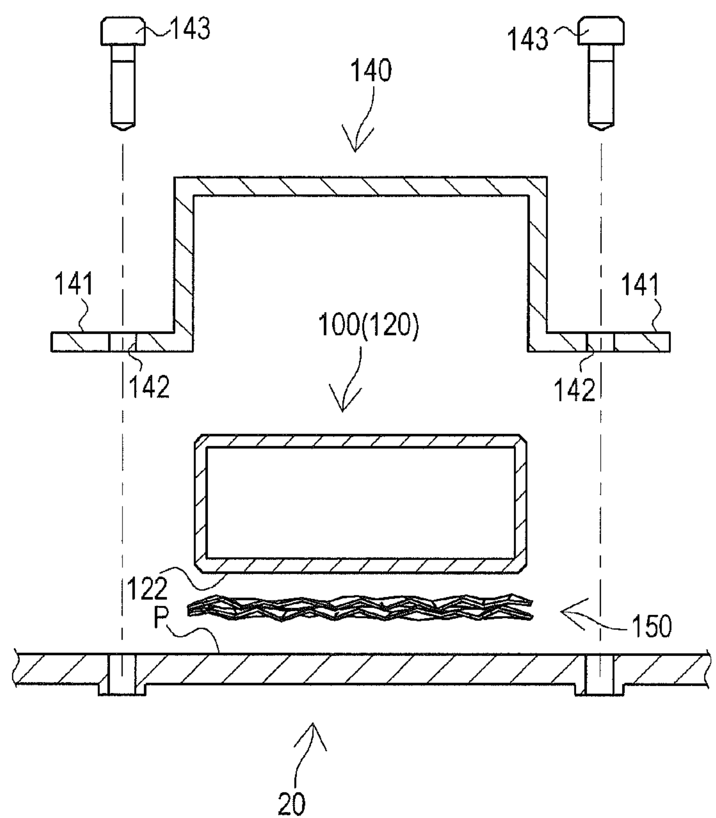
FIG. 7 (*a*) An exploded plan view of attachment construction of the cooling unit. (*b*) An exploded plan view of attachment construction of the cooling unit.
Figure 7:
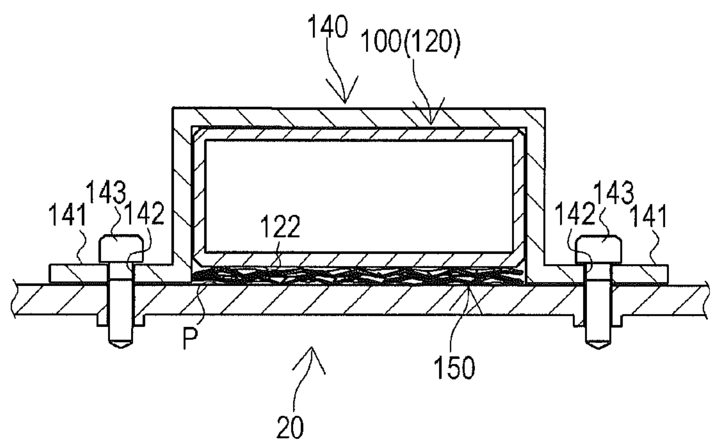

Next, an explanation will be given on the attachment construction of the work piece conveying mechanism 20 of the cooling unit 100 to the to-be-cooled surface P in detail referring to FIG. 7.

As mentioned above, the cooling unit 100 is attached in the state that any part of the outer wall part 122 of the cooling main body 120 is in close contact with the to-be-cooled surface P of the work piece conveying mechanism 20. In more detail, as shown in FIG. 7, the cooling unit 100 is attached mainly with a bracket 140 and an aluminum film 150.

The bracket 140 attaches the cooling unit 100 closely to the to-be-cooled surface P of the work piece conveying mechanism 20. The bracket 140 is substantially U-like shaped in sectional plan view in the state that the side of the bracket 140 facing the to-be-cooled surface P is opened. In the bracket 140, the cooling unit 100 is stored. A bracket rib 141 is extended outward from the end of the bracket 140 at the side of the to-be-cooled surface P. A plurality of bolt holes 142 are formed in the bracket rib 141. Accordingly, the bracket 140 is attached to the work piece conveying mechanism 20 via bolts 143 inserted into the bolt holes 142 so as to store the cooling unit 100 and to make the outer wall part 122 of the cooling main body 120 be in close contact with the to-be-cooled surface P of the work piece conveying mechanism 20.

The aluminum film 150 leaves no space between the outer wall part 122 of the cooling main body 120 and the to-be-cooled surface P of the work piece conveying mechanism 20 (makes the outer wall part 122 be in close contact with the to-be-cooled surface P more certainly). The aluminum film 150 is arranged over the whole surface at which the outer wall part 122 of the cooling main body 120 is in close contact with the to-be-cooled surface P of the work piece conveying mechanism 20. In this embodiment, a plurality of the aluminum films 150 are crumpled wholly finely (formed so as to have width in thickness direction) and laminated.

Herein, as mentioned above, the cooling of the to-be-cooled surface P of the work piece conveying mechanism 20 by the cooling unit 100 is performed by the heat absorbing action of the outer wall part 122 using the heat of evaporation. Then, preferably, the outer wall part 122 is as closer to the to-be-cooled surface P as possible. However, the outer wall part 122 and the to-be-cooled surface P are formed by relative hard material. Namely, between the outer wall part 122 and the to-be-cooled surface P, closely adhering parts and slightly separated parts tend to be formed. At the slightly separated parts, thermal conductivity from the to-be-cooled surface P to the outer wall part 122 is worsened.

Concerning the above problem, as mentioned above, the aluminum film 150 is arranged over the whole surface at which the outer wall part 122 of the cooling main body 120 is in close contact with the to-be-cooled surface P of the work piece conveying mechanism 20. Namely, at the closely adhering parts, the creases of the aluminum film 150 are pressed toward the thickness direction and the aluminum film 150 is inserted between the outer wall part 122 and the to-be-cooled surface P in the state that substantially flattened. On the other hand, at the slightly separated parts, the creases of the aluminum film 150 are pressed slightly toward the thickness direction and the aluminum film 150 is inserted between the outer wall part 122 and the to-be-cooled surface P in the state that a number of the creases are remained.

Accordingly, by the aluminum film 150, at both the part at which the outer wall part 122 is in close contact with the to-be-cooled surface P and the part at which the outer wall part 122 is slightly separated from the to-be-cooled surface P, the outer wall part 122 is in close contact with the to-be-cooled surface P over the whole adhering surface. As a result, the thermal conductivity from the to-be-cooled surface P to the outer wall part 122 is prevented from being worsened.

As mentioned above, the cooling unit 100 attached to the to-be-cooled surface P of the work piece conveying mechanism 20 independently (without connected to any member) can cool the to-be-cooled surface P. Namely, when the cooling unit 100 is attached to the to-be-cooled surface P of the work piece conveying mechanism 20, it is not necessary to connect a plurality of pipe members to a pump for example as the conventional art. Therefore, the leak of the water as the coolant and the vacuum leak do not occur as the conventional art. Since any pump is not required as the conventional art, the cooling unit 100 is formed with comparative easy construction, thereby reducing the cost. The work piece conveying mechanism 20 can turn clockwise and counterclockwise when viewed in plan in the state that any pipe member connected to the pump does not interfere (the turning angle of the work piece conveying mechanism 20 is not regulated).

The material inserted between the outer wall part 122 of the cooling main body 120 and the to-be-cooled surface P of the work piece conveying mechanism 20 preferably has high thermal conductivity so as to show cooling effect easily. In this embodiment, the aluminum film is used. That is because the aluminum film has higher mal conductivity than a stainless mesh so as to show cooling effect more easily when the aluminum film is compared with the stainless mesh as the material which has high thermal conductivity and can be inserted between the outer wall part 122 of the cooling main body 120 and the to-be-cooled surface P of the work piece conveying mechanism 20.

Accordingly, by using the aluminum film 150 as the material inserted between the outer wall part 122 of the cooling main body 120 and the to-be-cooled surface P of the work piece conveying mechanism 20, the cooling effect of the cooling unit 100 for the to-be-cooled surface P of the work piece conveying mechanism 20 can be shown maximally.

In the above explanation, the work piece conveying mechanism 20 has the mechanism slidingly moving the first hand 51 and the second hand 52 (sliding mechanism). However, the "work piece conveying mechanism" according to the present invention is not limited to that having the sliding mechanism.

Figure 8:
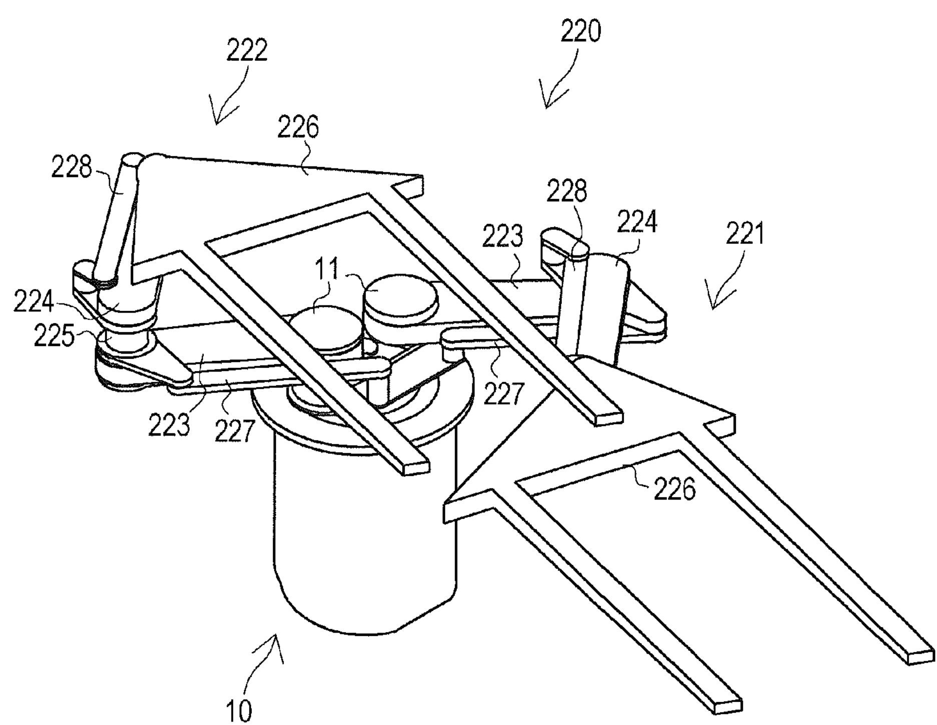
FIG. 8 A perspective view of entire construction of a work piece conveying equipment according to a second embodiment of the present invention.
Figure 9:
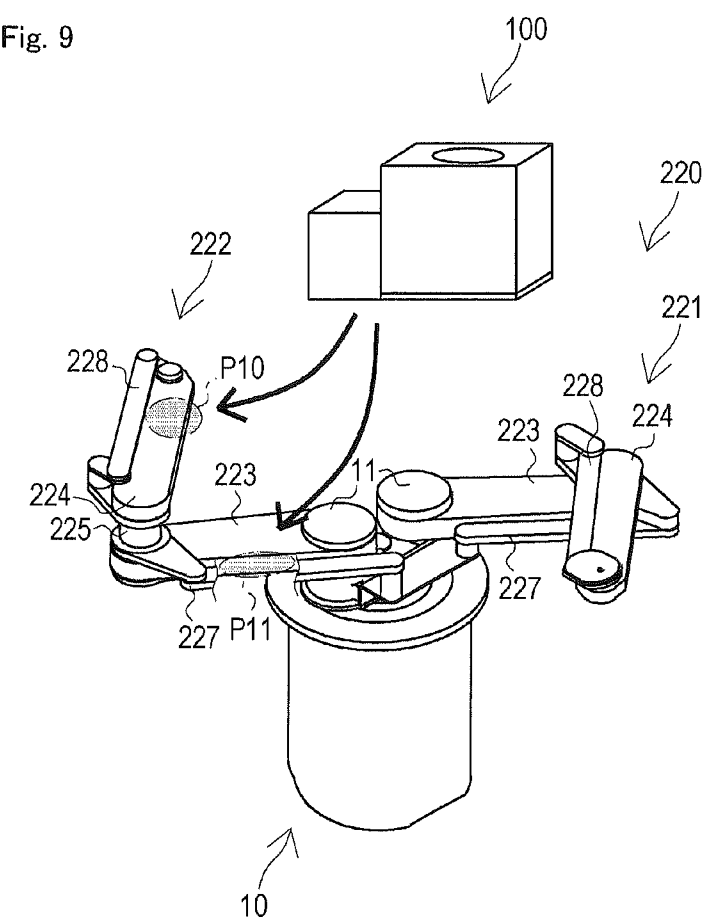
FIG. 9 A perspective view of the work piece conveying equipment in FIG. 8 omitting illustration of hands.

An explanation will be given easily on a work piece conveying mechanism having a link arm (hereinafter, referred to as a "second work piece conveying mechanism 220") as another embodiment of the "work piece conveying mechanism" according to the present invention referring to FIGS. 8 and 9. In below explanation, the explanation will be omitted on the parts having the same construction as those of the work piece conveying mechanism 20.

The second work piece conveying mechanism 220 mainly includes a first link arm part 222 and a second link arm part 221. Since the first link arm part 222 and the second link arm part 221 have substantially the same construction, the construction of the first link arm part 222 will be explained below and the explanation of the construction of the second link arm part 221 is omitted.

The first link arm part 222 has a lower arm 223 and an upper arm 224 which are substantially long plate-like members. One of the ends of the lower arm 223 is connected to the pivot 11 disposed in the upper portion of the casing 10 so as not to be rotatable relatively. The other end of the lower arm 223 is connected via a rotational shaft 225 to one of the ends of the upper arm 224 so as to be rotatable relatively. The other end of the upper arm 224 is connected to a hand 226 so as to be rotatable relatively. The lower arm 223 is rotatable clockwise and counterclockwise centering on the axis of the pivot 11 when viewed in plan. The upper arm 224 is rotatable clockwise and counterclockwise via a lower link 227 attached to the lower arm 223 and the like centering on the axis of the rotational shaft 225 when viewed in plan. The hand 226 is rotatable clockwise and counterclockwise when viewed in plan at the other end of the upper arm 224 via the lower link 227 and an upper link 228 attached to the lower arm 223 and the upper arm 224. Accordingly, the first link arm part 222 can transport the work piece held by the hand 226 to a suitable position.

In the second work piece conveying mechanism 220 as mentioned above, for example, it is difficult to attach a cooling pipe such as the conventional art. In more detail, as the part arranged near the work piece with high temperature held by the hand 226 (members surrounding the work piece as the to-be-cooled surface P in the second work piece conveying mechanism 220, as shown in FIG. 9, the upper surface of the upper arm 224 (to-be-cooled surface P10), the side surface of the lower arm 223 (to-be-cooled surface P11) and the like are supposed. When the cooling pipe is arranged in the to-be-cooled surface P10 or the to-be-cooled surface P11 as the conventional art, the pipe member connected to the lower portion of the casing 10 (the pump) interferes with the lower arm 223 and the upper arm 224 or the lower link 227 and an upper link 228, whereby the lower arm 223 and the upper arm 224 cannot be rotated.

Concerning the above problem, as mentioned above, the cooling unit 100 attached to the to-be-cooled surface P of the second work piece conveying mechanism 220 independently (without connected to any member) can cool the to-be-cooled surface P. Namely, when the upper arm 224 and the lower arm 223 can be rotated clockwise and counterclockwise when viewed in plan without interfering with the pipe member for example (the turning angle of the second work piece conveying mechanism 220 is not regulated).

As mentioned above, the cooling unit 100 according to the embodiment of the present invention which cools the to-be-cooled surface P of the work piece conveying mechanism 20 conveying the work piece in the vacuum chamber, includes:

the lower space S1 (coolant container) storing the water as the coolant;

the outer wall part 122 constituting the outer wall of the lower space S1 (coolant container) and having thermal conductivity; and the vapor exhaust unit 130 (vapor exhaust part) which can discharge the vapor generated from the coolant stored in the lower space S1 (coolant container) to the outside of the lower space S1 (coolant container), wherein the cooling unit 100 is attached to the work piece conveying mechanism 20 in the state that the outer wall part 122 is in close contact with the to-be-cooled surface P, wherein the coolant stored in the lower space S1 (coolant container) is evaporated by the heat transmitted from the to-be-cooled surface P via the outer wall part 122, and the to-be-cooled surface P is cooled via the outer wall part 122 by the heat of evaporation lost at the time of the evaporation of the coolant, and wherein the vapor in the lower space S1 (coolant container) is discharged to the vacuum chamber by the vapor exhaust unit 130 (vapor exhaust part) when the pressure of the vapor in the lower space S1 (coolant container) reaches the fixed value or higher.

The vapor exhaust unit 130 (vapor exhaust part) includes:

the communication part 131 (communication part) causing the lower space S1 (coolant container) to communicate with the vacuum chamber;

the valve body 134 arranged in the reciprocatingly movable manner inside the communication part 131 (communication part);

the sealing member 133 located on the lower space S1 (coolant container) side relative to the valve body 134 in the communication part 131 (communication part) and arranged in close contact with the valve body 134 so as to seal the inside of the communication part 131 (communication part); and the spring 135 (biasing means) biasing the valve body 134 toward the sealing member 133, wherein the valve body 134 is opened and closed relative to the sealing member 133 in accordance with the pressure of the vapor in the lower space S1 (coolant container) so as to switch the sealing state of the inside of the communication part 131 (communication part).

The work piece conveying equipment 1 according to the embodiment of the present invention employing the work piece conveying mechanism 20 conveying the work piece in the vacuum chamber, includes the cooling unit cooling the to-be-cooled surface P of the work piece conveying mechanism 20, and a cooling unit 100 is employed as the cooling unit.

The cooling unit 100 is attached to the work piece conveying mechanism 20 in the state that the aluminum film 150 is inserted between the outer wall part 122 and the to-be-cooled surface P.

According to the construction, in the cooling unit 100, the influence of the radiation heat from the work piece having high temperature on the members surrounding the work piece can be reduced, the leak of the water as the coolant and the vacuum leak do not occur, and the cost can be reduced. The turning angle of the work piece conveying mechanism 20 is not regulated.

The invention claimed is:

1. A cooling unit, which cools a to-be-cooled surface of a work piece conveying mechanism conveying a work piece in a vacuum chamber, the cooling unit comprising:

a coolant container storing a coolant;

an outer wall part constituting an outer wall of the coolant container and having thermal conductivity; and a vapor exhaust part which can discharge vapor generated from the coolant stored in the coolant container to an outside of the coolant container, the vapor exhaust part comprising:

a communication part causing the coolant container to communicate with the vacuum chamber;

a valve body arranged in a reciprocating movable manner in the communication part;

a sealing member located on the coolant container side relative to the valve body in the communication part and arranged in close contact with the valve body so as to seal the inside of the communication part; and a biasing means biasing the valve body toward the sealing member;

wherein the cooling unit is attached to the work piece conveying mechanism in a state that the outer wall part is in close contact with the to-be-cooled surface, wherein the coolant stored in the coolant container is evaporated by heat transmitted from the to-be-cooled surface via the outer wall part, and the to-be-cooled surface is cooled via the outer wall part by heat of evaporation lost at the time of the evaporation of the coolant, and wherein the vapor in the coolant container is discharged to the vacuum chamber by the vapor exhaust part by opening and closing the valve body relative to the sealing member in accordance with the pressure of the vapor in the coolant container so as to switch the sealing state of the inside of the communication when a pressure of the vapor in the coolant container reaches a fixed value or higher.

2. A work piece conveying equipment including a work piece conveying mechanism conveying a work piece in a vacuum chamber, including:

a cooling unit cooling a to-be-cooled surface of the work piece conveying mechanism, wherein a cooling unit according to claim 1 is included as the cooling unit.

3. The work piece conveying equipment according to claim 2, wherein the cooling unit is located next to the work piece conveying mechanism in a state that an aluminum film is in between the outer wall part and the to-be-cooled surface.

* * * * *